United States Patent [19]

Bottrill

[11] Patent Number: 5,081,546

[45] Date of Patent: Jan. 14, 1992

[54] VEHICLE EXTERIOR MIRROR

[75] Inventor: John Bottrill, Chichester, England

[73] Assignee: Britax Wingard Limited, England

[21] Appl. No.: 556,296

[22] Filed: Jul. 20, 1990

[30] Foreign Application Priority Data

Jul. 22, 1989 [GB] United Kingdom ............. 8916831

[51] Int. Cl.$^5$ ............. G02B 5/08; B60R 1/06
[52] U.S. Cl. .................. 359/841; 359/872;
  248/478; 248/486
[58] Field of Search .......... 350/631, 632, 604;
  248/475.1, 476, 477, 478, 479, 486, 900

[56] References Cited

U.S. PATENT DOCUMENTS

| | | | |
|---|---|---|---|
| 3,339,876 | 9/1967 | Kampa | 248/478 |
| 3,346,229 | 10/1967 | Carson, Jr. | 248/477 |
| 3,384,334 | 5/1968 | Malachowski | 248/478 |
| 3,433,511 | 3/1969 | Frankel | 248/477 |
| 3,784,149 | 1/1974 | Brudy | 248/478 |
| 4,523,735 | 6/1985 | Beck et al. | 248/476 |
| 4,623,115 | 11/1986 | Brester | 248/479 |
| 4,852,970 | 8/1989 | Kitrell | 248/478 |

FOREIGN PATENT DOCUMENTS

| | | | |
|---|---|---|---|
| 0221255 | 5/1987 | European Pat. Off. | 250/631 |
| 1500767 | 8/1969 | Fed. Rep. of Germany | 248/478 |
| 13402 | 6/1911 | United Kingdom | 248/478 |

Primary Examiner—Bruce Y. Arnold
Assistant Examiner—R. D. Shafer
Attorney, Agent, or Firm—Davis, Bujold & Streck

[57] ABSTRACT

An exterior rear view mirror for a motor vehicle has a housing containing a reflective member and being adapted to be secured to a bracket, mounted on the vehicle body, by first and second arms. Each arm is pivotally connected to the bracket for relative angular movement about a pivot axis. In order to hold the housing at a predetermined orientation relative to the bracket means, a first pair of detent formations on the second support element diametrically spaced on opposite sides of the pivot axis is adapted to engage with a first pair of complementary formations on one face of a washer located between the second support element and the bracket means, and a second pair of detent formations on the opposite face of the washer diametrically spaced apart from one another relative to the pivot axis and orientated at 90° to the first pair of complementary formations, the second pair of detent formations, is adapted to engage with a second pair of complementary formations on the bracket.

4 Claims, 2 Drawing Sheets

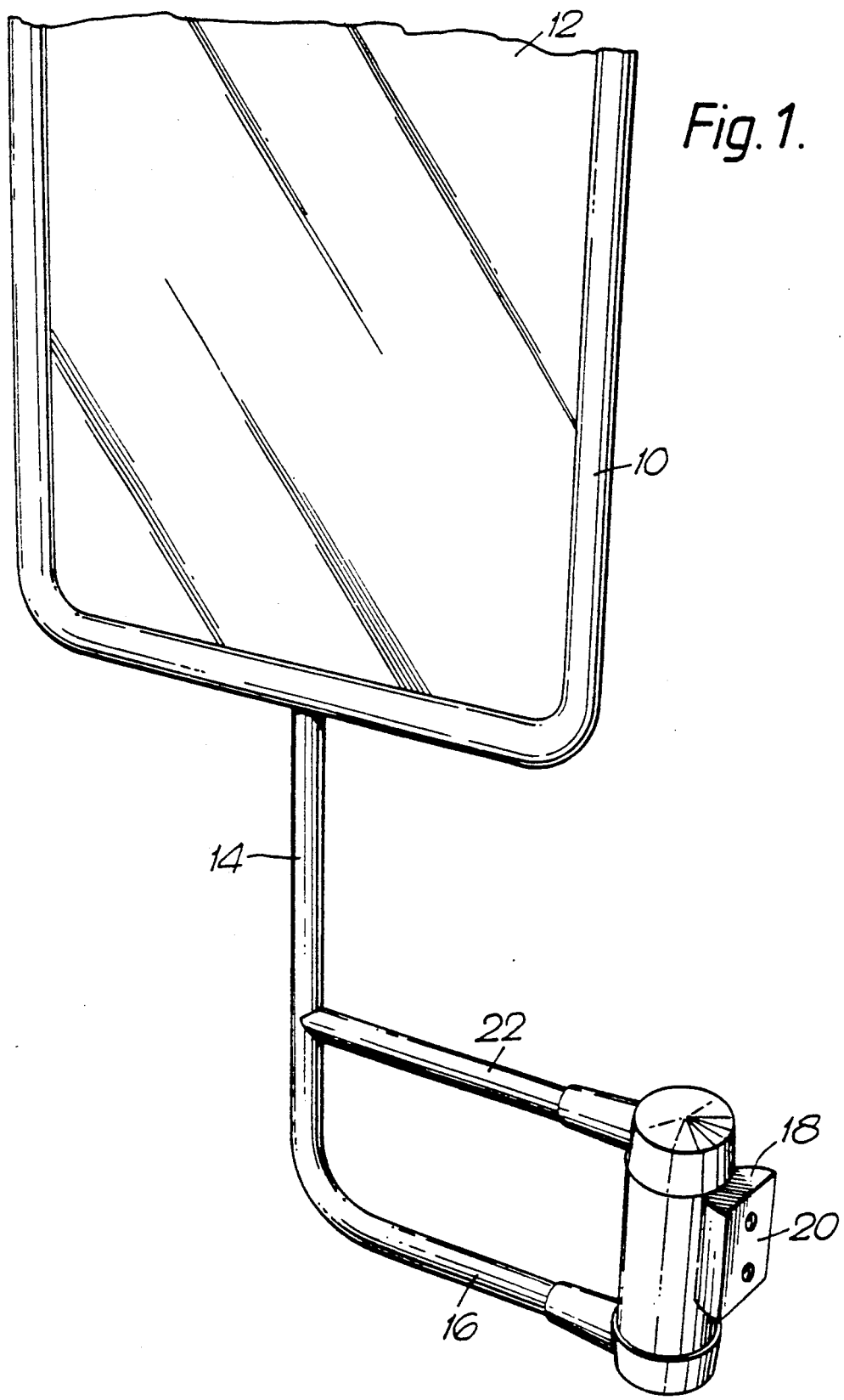

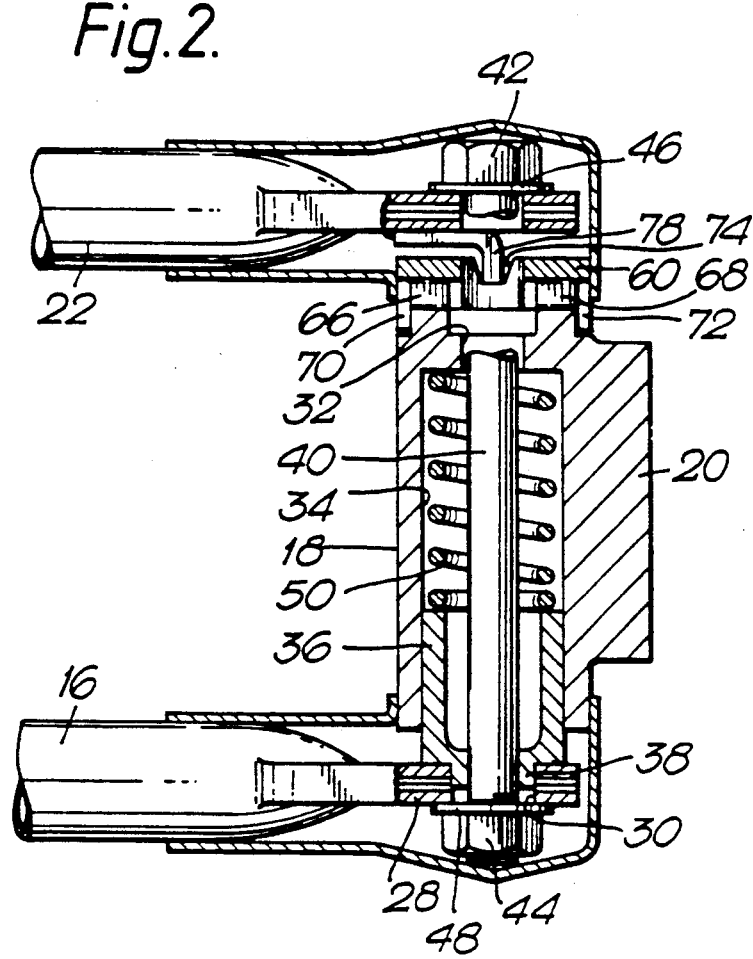
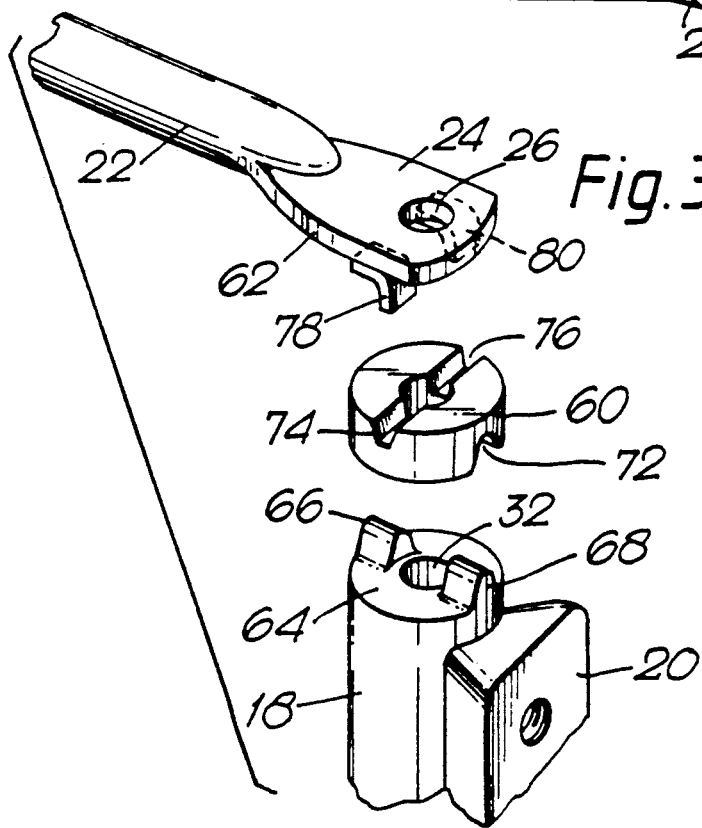

VEHICLE EXTERIOR MIRROR

BACKGROUND OF THE INVENTION

This invention relates to an exterior rear view mirror for a motor vehicle of the type comprising bracket means adapted to be secured to the vehicle body, and a housing containing a reflective member and having first and second support elements each of which is pivotally connected to the bracket means for relative angular movement about a pivot axis, the pivotal connection between the second support element and the bracket means including detent means adapted to hold the housing at a predetermined orientation relative to the bracket means, the second support element being movable relative to the bracket means parallel to the pivot axis to effect engagement and disengagement of the detent means, and resilient means being arranged to urge the detent formations into engagement.

The invention is applicable to exterior mirrors of the type in which each support element comprises an arm projecting laterally from the housing. The two arms may be widely spaced from one another with each pivotally connected to a separate bracket adapted to be secured to the vehicle body. For example, one arm may be located above the mirror housing and the other below it. Alternatively, the two arms may be relatively close to one another, the bracket means consisting of a single bracket to which both are pivotally connected.

With this type of mirror, any misalignment between the pivot axes of the two pivot joints can prevent the detent formations coming into full engagement with one another with the result that there is free play between the arms and the bracket means. The present invention aims to provide a mirror assembly which is not subject to this disadvantage.

BRIEF SUMMARY OF THE INVENTION

According to the invention, in a mirror assembly of the type described above, the detent means comprises a first pair of detent formations on the second support element diametrically spaced on opposite sides of the pivot axis and adapted to engage with a first pair of complementary formations on one face of a washer located between the second support element and the bracket means, and a second pair of detent formations on the opposite face of the washer diametrically spaced apart from one another relative to the pivot axis and orientated at 90 to the first pair of complementary formations, the second pair of detent formations being adapted to engage with a second pair of complementary formations on the bracket means.

With this arrangement, the washer is capable of limited angular movement relative to the second support element about a first axis perpendicular to the pivot axis and is capable of similar limited angular movement relative to the bracket means about a second axis perpendicular both to the pivot axis and the first axis, thus allowing all the detent formations to engage fully with their respective complementary formations even if misalignment of the pivot axis of the first support element causes the second support element to be twisted so that the face thereof carrying the first detent formations is not truly parallel to the face of the bracket means carrying the second complementary formations.

In order to facilitate re-engagement of the detent formations after the housing has been displaced from its predetermined orientation, the detent formations and their respective complementary formations are so shaped that tends to remain in engagement with its respective complementary formations. For this purpose, in one form of the invention, one of the pairs of detent formations has side faces which are substantially parallel to each other, while the other pair of detent formations has sloping side faces to facilitate disengagement.

BRIEF DESCRIPTION OF THE DRAWINGS

FIG. 1 is a perspective view of an exterior rear view mirror in accordance with the invention, in which the support elements take the form of laterally projecting arms;

FIG. 2 is a sectional view of the pivot joint connecting the arms to the bracket of the embodiment shown in FIG. 1; and FIG. 3 is an exploded perspective view illustrating the detent formations of the embodiment shown in FIGS. 1 and 2.

DETAILED DESCRIPTION

Referring first to FIG. 1, a mirror assembly comprises a mirror housing 10 containing a reflective member 12 mounted on the vertical limb 14 of an L-shaped member, the horizontal limb of which forms a lower arm 16 which is pivotally connected to the bottom of a bracket 18. The bracket 18 has a face 20 intended to abut against a vehicle body (not shown). An upper arm 22 has one end pivotally connected to the top of the bracket 18 and the other end welded onto the vertical limb 14 of the L-shaped member.

As can be seen from FIGS. 2 and 3, the end 24 of the upper arm 22 connected to the bracket 18 is flattened and contains a hole 26. The corresponding end 28 of the lower arm 16 is similarly flattened and contains a hole 30. The upper surface of the bracket 18 contains a hole 32 which extends into an enlarged cylindrical cavity 34, the bottom end of which contains a cylindrical slider 36 having a stub formation 38 which is received in the hole 30 in the end 28 of the lower arm 16. A bolt 40 extends through the hole 26 in the upper arm 22, the hole 32 in the top of the bracket 20, the cylindrical cavity 34, a central hole in the slider 36 and the hole 30 in the lower arm 16. Respective nuts 42 and 44 on the ends of the bolt 40 hold washers 46 and 48 in engagement with the flattened ends 24 and 28 of the arms 22 and 16 respectively. A compression spring 50 engages between the top of the cylindrical cavity 34 and the top of the slider 36 so as to urge the arms 16 and 22 downwardly relative to the bracket 20.

In accordance with the invention, a washer 60 is located between the lower surface 62 of the flattened end portion 24 of the upper arm 22 and the top surface 64 of the bracket 18. A pair of detent formations 66 and 68 are located on the surface 64 at diametrically spaced locations around the hole 32. The formations 66 and 68 have sloping side surfaces and engage in correspondingly shaped grooves 70 and 72 in the bottom surface of the washer 60.

The washer 60 has a pair of diametrically spaced grooves 74 and 76, of rectangular cross-section, in its top surface, orientated at 90° to the grooves 70 and 72 in its bottom surface. The lower surface 62 of the flattened end portion 24 of the upper arm 22 carries a pair of downwardly projecting lugs 78 and 80 which engage in the grooves 74 and 76 respectively.

In use, if the arms 16 and 22 are displaced manually from the orientation illustrated, the projections 66 and 68 ride up the sloping side walls of the grooves 72 and 74, compressing the spring 50. The lugs 78 and 80 remain in engagement with the rectangular slots 74 and 76. Consequently, when the arms 16 and 22 are moved back to their preferred orientation, the lugs 78 and 80 move the washer 60 back to the correct orientation for the detent formations 66 and 68 to re-engage.

It will be appreciated that, since the arm 22 is welded onto the arm 16, it is difficult to ensure that the lower surface 62 of the flattened end portion 24 thereof is accurately perpendicular to the axis of the bolt 40. However, because the grooves 74 and 76 are oriented at right angles to the grooves 70 and 72, any such misalignment does not prevent the projections 66 and 68 from engaging firmly in the top of the grooves 70 and 72 or the lugs 78 and 80 from engaging in the bottoms of the slots 74 and 76 since the washer 60 will rock as required to accommodate any such misalignment.

I claim:

1. An exterior mirror for a motor vehicle comprising bracket means for securing said exterior mirror to a vehicle body, a housing containing a reflective member, first and second support elements rigidly connected to each others secured to the housing and pivotally connected to the bracket means for relative angular movement about a pivot axis, and a washer located between the second support element and the bracket means, a first pair of ribs diametrically spaced on opposite sides of the pivot axis on one o the second support element and one face o the washer, a first pair of groves on the other of the second support element and said one face of the washer to engage with the first pair of ribs only along a first line of contact to form a first detent formation, a second pair of ribs on one of the opposite face o the washer and the bracket means diametrically spaced apart from one another relative to the pivot axis, a second pair of grooves on the other of said second face of the washer and the bracket means to engage with the second pair of ribs only along a second line of contact to form a second detent formation, orientated at 90° to the first line of contact, a slider mounted on the bracket means for movement parallel to the pivot axis to engage with the first support element, and a compression spring engaging between the bracket means and the slider, the first and second support elements being movable relative to the bracket means parallel to the pivot axis to effect engagement and disengagement of one of said first and second detent formations.

2. An exterior mirror according to claim 1, wherien one of said first and second detent formations is so shaped as to remain engaged after the housing has been displaced from it predetermined orientation.

3. An exterior mirror according to claim 2, wherein one of the pairs of ribs has side faces which are substantially parallel to each other, while the other pair of ribs has sloping side faces.

4. An exterior mirror for an motor vehicle comparison bracket means for securing said exterior mirror to a vehicle body, a housing containing a reflective member, first and second support elements rigidly connected to each other, secured to the housing and pivotally connected to the bracket means for relative angular movement about a pivot axis, a washer located between the second support element and the bracket means, a first pair of ribs diametrically spaced on opposite sides of the pivot axis on the second support element, a first pair of grooves on a first face of the washer to engage with the first pair of ribs only along a first line of contact to form a first detent formation, a second pair of ribs on the bracket means diametrically spaced part from one another relative to the pivot axis, a second pair of grooves on a second face of the washer to engage with the second pair of ribs only along a second line of contact, to form a second dentent formation, orientated at 90° to the first line of contact, a slider mounted on the bracket means for movement parallel to the pivot axis to engage with eh first support element, and a compression spring engaging between the bracket means and the slider, the first and second support elements being movable relative to the bracket means parallel to the pivot axis to effect engagement and disengagement of one of said fist and second detent formations.

* * * * *

UNITED STATES PATENT AND TRADEMARK OFFICE
CERTIFICATE OF CORRECTION

PATENT NO. : 5,081,546

DATED : January 14, 1992

INVENTOR(S) : John BOTTRILL

It is certified that error appears in the above-identified patent and that said Letters Patent is hereby corrected as shown below:

```
column 3, line 26 replace "others" with --other,--;
         line 32 replace "o" with --of--; and
         line 37 replace "o" with --of--.

Column 4, line 16 replace "comparison" with --comprising--;
         line 35 replace "dentent" with --detent--; and
         line 38 replace "eh" with --the--.
```

Signed and Sealed this

Sixth Day of April, 1993

*Attest:*

STEPHEN G. KUNIN

*Attesting Officer*     *Acting Commissioner of Patents and Trademarks*